Sept. 22, 1964 S. P. BRICKETT ETAL 3,149,504
REDUCTION GEAR WITH CIRCULAR CASING
Filed June 20, 1962 2 Sheets-Sheet 1
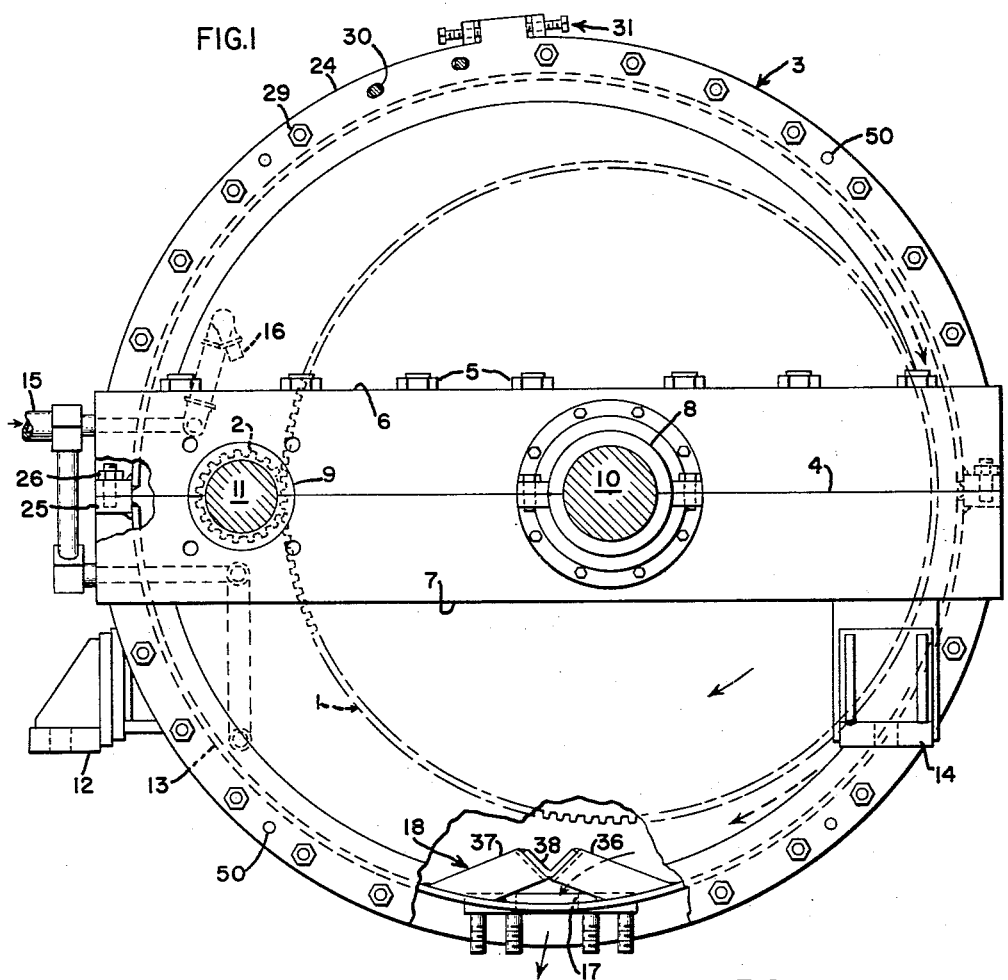
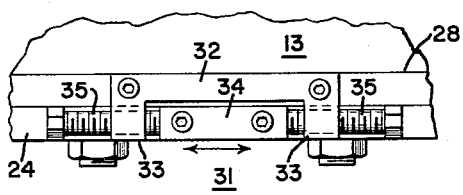
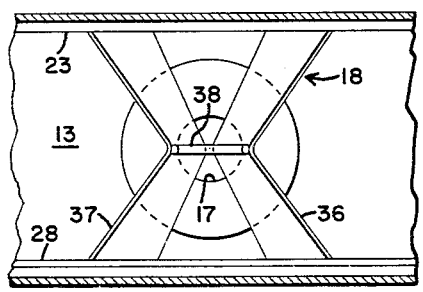
INVENTOR:
SHERMAN P. BRICKETT,
EDWARD D. HETER,
BY W. C. Crutcher
HIS ATTORNEY.

Sept. 22, 1964  S. P. BRICKETT ETAL  3,149,504
REDUCTION GEAR WITH CIRCULAR CASING
Filed June 20, 1962  2 Sheets-Sheet 2
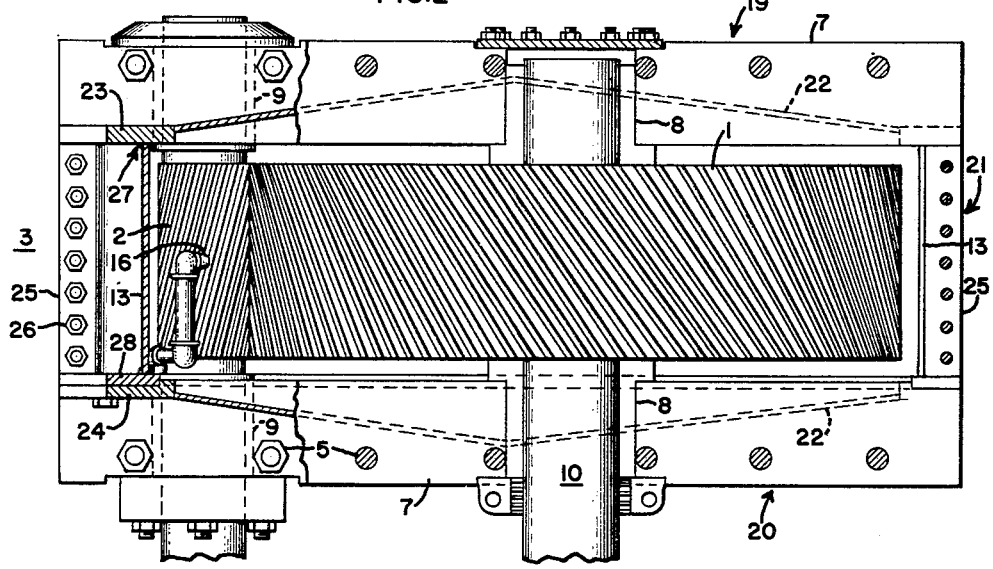
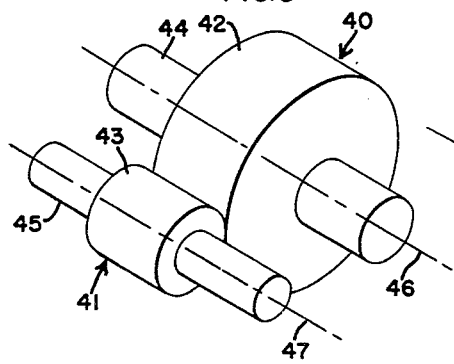
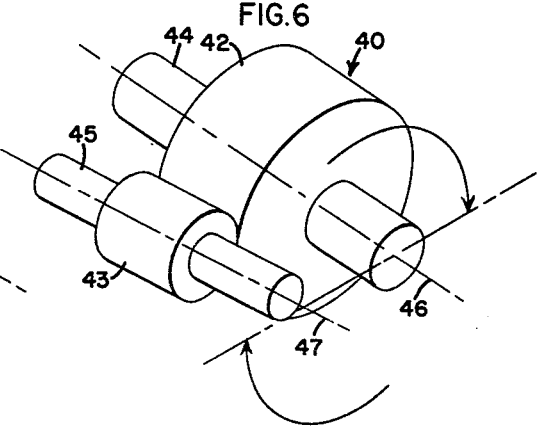
INVENTORS:
SHERMAN P. BRICKETT,
EDWARD D. HETER,
BY W. C. Crutcher
THEIR ATTORNEY.

United States Patent Office 3,149,504
Patented Sept. 22, 1964

3,149,504
REDUCTION GEAR WITH CIRCULAR CASING
Sherman P. Brickett, Derry, N.H., and Edward D. Heter, Peabody, Mass., assignors to General Electric Company, a corporation of New York
Filed June 20, 1962, Ser. No. 203,899
7 Claims. (Cl. 74—606)

This invention relates to an improved arrangement for a reduction gear and the casing therefor, which includes improved means for controlling gear tooth contact and for insuring proper circulation of the lubricant.

In high torque precision gearing, proper alignment of the gears with uniform contact along the surfaces of the meshing gear teeth is paramount in insuring long life of the gears, as well as quiet and smooth operation. Reduction gear sets, such as might be used to couple a turbine with a generator, are often produced as an integral unit containing a pinion and a gear within a casing with suitable bearings for the gear rotors. Although such reduction gears may employ spur teeth, they are more generally furnished with single helical or double helical teeth to reduce noise and vibration. Although the hobbing machines used to cut such helical teeth do so with great precision and accuracy, there are often very slight variations between hobbing machines, which make the helix lead angles very slightly different between gears which are cut on different machines. Such variations are usually corrected by lapping or shaving the gear teeth in order to correct the lead angles and to ensure uniform tooth width.

The customary procedure for establishing uniform tooth contact across the gear face has been, first, to accurately control the bearing locations in the gear casings. Assuming that the gear teeth are perfectly matched, as to helix lead angle and tooth thickness, uniform tooth contact can then be achieved if the axes of the two gears are both parallel and coplanar. Therefore, extreme care has been necessary in controlling the locations of the four rotor bearings within the reduction gear casing, so as to achieve coplanar and parallel rotors.

Another factor in maintaining long gear life is proper lubrication. To this end, continuous oil flow with proper removal or "scavenging" of used oil from the casing is imperative.

Accordingly, one object of the present invention is to provide an improved reduction gear arrangement for providing uniform gear tooth contact.

Another object of the invention is to provide a reduction gear arrangement which reduces the time necessary to properly align gear teeth in a set of mating gears.

Another object of the invention is to provide a reduction gear casing with improved means for scavenging of the lubricating oil therefrom.

The subject matter which is regarded as the invention is particularly pointed out and distinctly claimed in the concluding portion of the specification. The invention however, both as to organization and method of practice, together with further objects and advantages thereof, may best be understood by reference to the following description taken in connection with the accompanying drawings in which:

FIG. 1 is an end view of a reduction gear set, with portions broken away to show particular features thereof;

FIG. 2 is a plan view of the lower half of the gear casing of FIG. 1, with the gears shown in full;

FIG. 3 is an enlarged view of a special gear casing aligning mechanism which may be used to adjust the casing of FIGS. 1 and 2;

FIG. 4 is an enlarged plan view of the oil scavenging device used in the casing of FIGS. 1 and 2; and FIGS. 5 and 6 are schematic representations of gear rotors illustrating the method of alignment which is possible with the disclosed reduction gear casing.

Briefly stated, the invention in one form is carried out by providing a circular gear casing end which is slightly rotatable with respect to the opposite casing end. Both ends carry the rotor bearings, and uniform gear tooth contact is achieved by intentionally creating non-coplanarity of the rotor axes by an amount to compensate for the difference in lead angles, if any, between the mating gears. A central casing cylinder enclosing the gears between casing ends is utilized, together with a special scavenging device, to promote proper lubrication.

Referring now to FIG. 1 of the drawing, a gear 1 and a pinion 2 are enclosed in a circular gear casing shown generally as 3. Casing 3 is horizontally split along a line 4 into upper and lower halves secured together by bolts 5 between massive end flanges 6, 7. Flanges 6, 7 are preferably integral portions of the end walls and serve to hold split bearing liners 8, 9 journaling the shafts 10, 11 of gears 1 and 2 respectively.

Casing 3 is supported by a 3-point mount comprising a single mounting bracket 12 attached to a central casing cylinder 13 on the left, and by a pair of brackets 14 (only one shown) attached to the lower end flanges 7 on either side of casing 3 on the right. Suitable modifications of brackets 12, 14 will allow the gear casing 3 to be mounted in any particular orientation desired, however the casing is shown in FIG. 1 with the casing dividing line 4 disposed in a horizontal plane.

Lubrication for gears 1, 2 is provided by oil pumped through a suitable inlet pipe 15 to an oil nozzle 16 directed at the meshing gear teeth. Used oil flows down either side of the central casing cylinder wall 13 and out through discharge port 17 to the sump (not shown). A special double-V scavenging plow 18, to be described later in greater detail, is disposed over the discharge port 17 to facilitate scavenging, no matter in which direction the gears are rotating.

Referring now to FIG. 2 of the drawing, where the gears 1, 2 are shown disposed in their bearing liners in the lower half of casing 3, it is seen that the casing comprises semi-circular end halves 19, 20 and a central casing cylinder half 21. The upper half of casing 3 (not shown) is substantially identical to the lower half shown in FIG. 2. Each of the casing end halves 19, 20 includes the massive lower flanges 7 and integral end walls 22. The latter are preferably in the shape of oblique half-cones, although they could also be flat semi-circles.

The periphery of end wall 22 of casing end 19 is attached to a semicircular ring 23. Similarly, the periphery of the end wall 22 of opposite casing end 20 is attached to a specially rabbeted semi-circular ring 24.

The central casing cylinder enclosing the gears between casing ends is also made in halves. Each half comprises a half-cylinder 13 having opposite flanges 25 welded to diametrically opposite ends thereof, which are attached to similar flanges on the top half-cylinder along the casing centerline by bolts 26 (see also FIG. 1).

Casing half-cylinder 21 is attached to one of the casing end halves 19, while it is free to rotate with respect to the other casing end half 20. This is accomplished by securing one edge of the casing cylinder wall 13 to ring 23 as indicated by the arrow at 27, while attaching the other edge of casing cylinder wall 13 to a ring 28 which fits closely within the rabbeted ring 24 of the casing end 20.

The freedom of rotation of casing end halves 20 (after they are secured together at the flanges) with respect to the remainder of the casing is relatively limited and only sufficient to provide a very slight circular movement along the rabbet fit between rings 24 and 28. Reference to FIGS. 1 and 2 of the drawings illustrates that rings 24 and 28 are secured together by means of a circle of bolts 29. However, the holes for the bolts 29 in member 24 are very slightly elongated in a circumferential direction as indicated by the clearance at 30 (FIG. 1). Hence, when the nuts 29 are loosened, a very slight relative circumferential movement can take place between the opposite end walls 22 of the casing.

In order to provide controlled relative movement between casing ends, a casing adjustment device 31, seen at the top of FIG. 1, is used. The details of adjusting device 31 may be seen more clearly in the enlarged plan view of FIG. 3. Attached to the ring 28 on the casing cylinder 13 is a bracket 32 having threaded extensions 33. An abutment 34 is similarly attached to the rabbeted ring 24 between extensions 33. Adjusting bolts 35 are received in the threaded extensions 33 and abut either end of member 34. It will be apparent that by loosening one of the bolts 35 and tightening the other bolt 35, the controlled relative movement between members 24, 28 can be provided.

Another important feature of the gear casing is the scavenging plow seen in the plan view of FIG. 4. The plow comprises oppositely directed V-shaped walls, 36, 37, with the apex of the V's located above the oil discharge port 17. Members 36, 37 are secured together at their centers by an L-shaped piece 38, and are attached either to the casing cylinder rings 23, 28 or to the casing cylinder wall 13. The function of the scavenging plow 18 is to utilize the natural whirl of the oil in the circular casing due to the rotation of the gears (in either direction) so as to deflect spent oil downward through outlet port 17, as indicated by the arrows in FIG. 1. It will be seen that the cylindrical casing wall 13 promotes a circular movement of the lubricating oil and insures a smooth flow of the oil toward the scavenging plow which, in turn, insures full and complete removal thereof.

In FIGS. 5 and 6 are shown diagrammatic representations of a gear 40 and mating pinion 41. The mating portions are shown simply as cylinders of revolution 42, 43 respectively which are intended to represent the pitch circles of any type of gear tooth such as spur, helical, double helical, etc. It will be seen that the shafts 44, 45 of gears 40, 41 respectively lie along centerlines 46, 47 which are coplanar and parallel in FIG. 5.

In FIG. 6, the same members are designated with the same reference numerals as in FIG. 5. It will be seen, however, that the shafts 44, 45 have been rotated with respect to one another so that the axes 46, 47 are no longer coplanar, but are now skewed. It will be appreciated that such relative rotation can take place without actually changing the transverse spacing between bearings of the adjacent shafts, provided a slight axial movement of the shaft in the bearing is allowed to take place so as to provide for increased axial distance between bearings when the shafts are skewed.

The operation of the invention will be understood by recalling the diagrammatic FIGURES 5 and 6 in connection with the actual gear casing depicted in FIGS. 1 and 2. As was explained previously, the bearing liners 8, 9 are disposed between the massive end flanges 6, 7 on opposite end walls of the casing. One of the casing ends is free to rotate circumferentially with respect to the other casing end by means of the rabbet fit between members 24, 28 and the circumferential clearances 30 between the bolts 29 and the oversize holes in the casing end wall ring 24.

Prior to assembly, the difference in lead angles of the gears 1, 2 is determined precisely by accurate measurements, this being the amount by which it is necessary for the axes of the gears to be non-coplanar in order to provide uniform tooth contact. Although the term "lead angle" has primary reference to helical gears, the concept may be extended to spur gears, where the lead angle is zero degrees. After this difference in lead angles is determined, the gears are assembled in the casing without subjecting the gears to additional lapping and shaving operations to make the lead angles identical, as was necessary with the previous practice. The top and bottom casing halves are secured by means of bolts 5 and 26, and then the casing adjusting device 31 is employed to very slightly shift the free casing end circumferentially with respect to the other casing end by an amount necessary to properly achieve uniform tooth contact along the entire tooth contact line. After this is done, nuts 29 are tightened, and the rings 24, 28 may be further permanently secured against accidental shifting by drilling and fitting dowels 50 (see FIG. 1).

The circular casing, which aids in providing uniform gear tooth contact as described above, also is useful in providing automatic and positive scavenging of lubricating oil, when employed together with the scavenging plow 18. The rotation of the large gear 1 tends to produce a strong whirl of oil in the casing following the direction of rotation of the large gear. Since the casing wall is circular, there are no obstructions to impede the circumferential whirl of this oil until it reaches one of the open sides of the scavenging plow, whereupon it is deflected downward through the port 17. The strong circumferential currents thus induced also tend to positively entrain foreign particles and dirt to remove them from the casing with the lubricant. Thus, full and complete scavenging is afforded due to the cooperation of the circular casing, the disposition of the gears therein, and the scavenging plow 18.

The circular casing also allows mounting on the supporting structure in any desired orientation by means of the three-point mount consisting of brackets 12, 14. By a slight modification of these mounts, the casing parting line 4 can be disposed on a slight angle so as either to adjust the vertical centerlines between shafts 10, 11 or to adjust the vertical height of one shaft with respect to the other to suit a particular installation.

Also, another feature of the casing is that the conical end walls 22 and the circular casing cylinder wall 13 contribute greatly to reducing noise, since there are no flat planar surfaces on the casing wall which are prone to resonate from any vibration-inducing stimuli.

While there has been described what is considered to be the preferred embodiment of the invention, other arrangements and modifications will occur to those skilled in the art, and it is intended to cover in the appended claims all such modifications as fall within the true spirit and scope of the invention.

What is claimed as new and desired to be secured by Letters Patent of the United States is:

1. An integral gear set comprising:
   first and second gears having meshing teeth and each having oppositely extending shaft portions attached thereto, and
   a circular gear casing including opposite substantially parallel casing end disk members, each having bearing means disposed therein and rotatably journaling said first and second gear shaft portions, said casing end disk members being shiftable circumferentially through a limited arc relative to one another in parallel planes, whereby the shaft axis of one gear may be skewed slightly with respect to the other in order to accurately align the gear teeth.

2. An integral gear set comprising:
   first and second gears having meshing teeth and each having oppositely extending shaft portions attached thereto, and
   a circular gear casing including opposite coaxial substantially parallel circular casing ends, each having bearing means disposed therein rotatably journaling said first and second gear shaft portions, said casing ends being shiftable circumferentially through a limited arc relative to one another in parallel planes about their common axis, whereby the shaft axis of one gear may be skewed slightly with respect to the other in order to accurately align the gear teeth.

3. An integral gear set comprising:
first and second gears having meshing teeth and each having oppositely extending shaft portions attached thereto, and
a circular gear casing closely surrounding said gears and including opposite coaxial, substantially parallel circular casing ends secured to a central casing cylinder member spacing said ends, each of said circular casing ends having spaced bearing means disposed therein and rotatably journaling said first and second gear shaft portions, said casing ends also being shiftable circumferentially through a limited arc relative to one another in parallel planes about their common axis, whereby the axis of one gear may be skewed slightly with respect to the other in order to accurately align the gear teeth.

4. A gear set in accordance with claim 3 and including an outlet port defined in the lower part of the casing cylinder, and oil deflecting means disposed adjacent said port and extending into said casing cylinder for diverting lubricating oil through said outlet port, whereby the strong circumferential whirl of oil generated in the circular casings by rotation of the gears effects positive removal of oil and entrained solid particles from the casing through the outlet port.

5. An integral gear set comprising:
first and second gears having meshing teeth and each having oppositely extending shaft portions attached thereto,
first and second split circular casing end members each including a pair of mating casing end halves, said casing end halves each having a substantially semicircular end wall portion and a diametrical flange portion,
first and second spaced bearing means secured between said flange portions of each of said casing end members and rotatably journaling respective shaft portions of the first and second gears,
a split casing cylinder member secured between the casing end members and closely surrounding said gears and comprising a pair of mating half cylinders, said casing cylinder member being secured at one end thereof to said first casing end member,
means providing limited relative circumferential adjusting movement between said casing end members, said means comprising arcuate rabbeted portions defined between the casing cylinder member and the second casing end member, whereby the axis of the first gear can be skewed slightly with respect to the axis of the second gear in order to effect accurate adjustment of the gear mesh,
nozzle means supplying oil to said meshing gear teeth,
an oil scavenging port defined in the lower casing half cylinder, and
oil deflecting means disposed adjacent said port and extending into the casing cylinder from said port for diverting lubricating oil from the gear casing, whereby the strong circumferential whirl of oil generated in the circular gear casing by rotation of the gears effects positive removal of oil and entrained solid particles from the casing through said port.

6. An integral gear set comprising:
first and second gears having meshing teeth and each having oppositely extending shaft portions attached thereto,
a circular casing closely surrounding said gears and having first and second spaced coaxial circular end members each including a flange portion extending along a diameter thereof,
first and second spaced bearing means disposed in each of said flange portions and rotatably journalling the respective shaft portions of the first and second gears,
a casing cylinder member closely surrounding said gears and attached to the first casing end member and constructed and arranged to provide for relative circumferential adjustment of the second casing end member with respect to the casing cylinder member, and
adjusting means cooperating with the casing cylinder member and the second circular end member to effect a selected degree of limited relative circumferential movement between the casing cylinder member and second end member, whereby the shaft axis of one gear may be skewed slightly with respect to the other in order to accurately align the gear teeth, and
means securing the second end member relative to the casing cylinder member to prevent accidental relative movement therebetween after the gear teeth have been accurately aligned.

7. A gear set in accordance with claim 6 and including:
first and second oppositely disposed support means at one end of said flange portions of the first and second casing end members respectively, and
third support means disposed on said casing cylinder member between the casing end members adjacent the other end of said flange portions remote from said first and second support means, whereby a three-point support is provided for the casing.

References Cited in the file of this patent
UNITED STATES PATENTS

| | | |
|---|---|---|
| 2,093,372 | Short et al. | Sept. 14, 1937 |
| 2,729,519 | Bottenhorn | Jan. 3, 1956 |
| 2,950,628 | Bade | Aug. 30, 1960 |
| 3,011,358 | Moore | Dec. 5, 1961 |